United States Patent Office 3,513,431
Patented May 19, 1970

3,513,431
MEASURING TRANSDUCER, IN PARTICULAR FOR USE WITH WIRE STRAIN GAUGES
Sándor Kovács, Budapest, Hungary, assignor to Merestechnikai Kozponti Kutato Laboratorium, Budapest, Hungary
Filed July 1, 1968, Ser. No. 741,541
Claims priority, application Hungary, July 7, 1967, Me 864
Int. Cl. G01l 1/22
U.S. Cl. 338—5                                      2 Claims

ABSTRACT OF THE DISCLOSURE

An electromechanical transducer having an upper shoulder, a lower base and a central measuring body interposed between and spaced from said base and shoulder. First parallel ribs join said shoulder and measuring body and second parallel ribs join said measuring body and said base, said first and second ribs being alternately connected to said measuring body at spaced intervals along the periphery of said body. Strain gauges are fixed to the peripheral surface of said measuring body in the intervals between adjacent ones of said first and second ribs.

---

Figure 1:
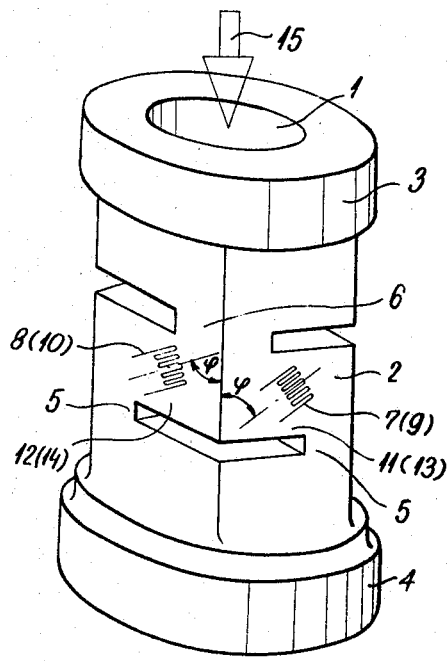

The invention relates to an electromechanical measuring transducer, which permits the creation of a non-homogeneous mechanical stress distribution condition, so that the whole measuring (Wheatstone) bridge can be built up from active elements, while the loaded portion of the measuring body, to be called below the measuring part, is subjected to shearing stress.

In most conventional measuring transducer the force to be measured acts on a measuring body and the resultant of the arising mechanical tension calculated on one cross section of said body keeps balance with the force to be measured. During this procedure the measuring body is deformed and the wire strain gauges sense this deformation as a change in the resistance, the extent of which depends on the conversion factor. In most conventional measuring transformers it has been attempted on the one hand to ensure a homogeneous stress distribution condition on the surfaces below the wire strain gauges; on the other hand, in most cases only unidirectional tensions were utilized and some of the elements constituting the measuring bridge were utilized only for compensation purposes. Recently in certain embodiments even those wire strain gauges which serve for compensation purposes have been made active parts of the bridge circuit, while the homogeneous tension field was maintained. For instance, in the case of measuring bodies formed as bent supports, it is possible to form Wheatstone bridges of this kind, from the wire strain gauges arranged on the surfaces subjected to compression and tension. Shearing stresses were only utilized for measuring torsional moments, in such a manner that the normal tensile stress or compressive stress arising under an angle of 45° as their resultant were measured with the aid of wire strain gauges. There are also known measuring elements subjected to twisting or torsional strain and containing tension-collecting places, formed for measuring forces and subjected to torsional stress, but the transmittal of forces to the measuring body requires a special constructional design. Another disadvantage of the known designs is the impossibility of a symmetrical arrangement, in spite of the various advantages to be achieved due to its correcting effect.

It is the object of the invention to construct a measuring transducer which permits the creation of an advantageous stress distribution condition in a simple geometrical arrangement, together with the utilization of active wire strain gauges in a complete measuring bridge. It is a further object of the invention to arrange the measuring body as well as the force-transmitting upper part and the lower part (base) transmitting the reaction forces in complete cylindrical symmetry. In this manner the effect of numerous parasitic factors is eliminated due to the self-correction within the measuring transformer.

The wire strain gauge may be arranged on any optional part of the tension field. In one preferable embodiment the wire strain gauge is arranged on those surfaces of the measuring body which are parallel to the line of action, in such a manner as to obtain wire strain gauges subjected alternatingly to tensile and compressive stress. On these surfaces the major part of mechanical stress appears as shearing stress, but in the course of deformation torques are also formed around the axis normal to the line of action of the force. These torques may be further subdivided into bending and torsional moments in the sections between two neighbouring ribs connected to the upper part or the lower part of the measuring transformer, respectively. The numerical determination of these moments by means of elementary theoretical mechanics, however, presents difficulties.

The invention is described below more particularly with reference to the accompanying drawings, in which illustrative embodiments of the arrangement according to the invention are represented.

FIG. 1 represents the measuring body of a measuring transducer according to the invention, in which the normal stress distribution condition formed as a resultant of the shearing stresses is utilized for measuring forces.

Figure 2:
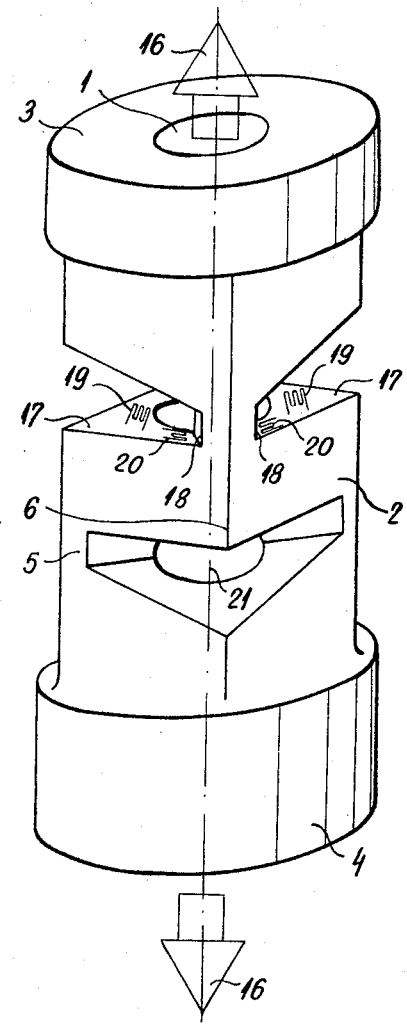
Figure 3:
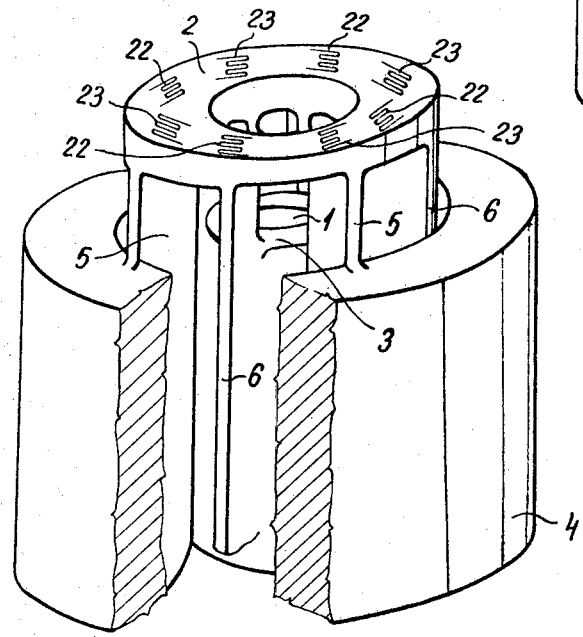

FIG. 2 shows another embodiment of the measuring transducer, in which the normal stress distribution condition resulting from bending stresses is utilized for deforming the wire strain gauges, whereas FIG. 3 shows an embodiment similar to that represented in FIG. 2, wherein the upper shoulder and the base are formed as coaxial cylinder rings, and the stresses as well as the reaction forces are transmitted to the measuring part by means of ribs.

In FIG. 1, a transducer is shown containing four measuring elements, each of these being loaded by one force couple and thus subjected to shearing stress. The force couple is constituted by a pair of ribs and, as a result of the constructional design, a common rib creates the force on two neighbouring ends of two measuring elements.

A bore 1 passes through the whole length of the transducer including a central measuring body 2, an upper shoulder 3 and a lower base 4. The connection between base 4 and measuring body 2 is provided by a pair of parallel spaced ribs 5 and between the shoulder 3 and the base 4 by a pair of parallel spaced ribs 6. Ribs 5 and 6 are alternately disposed about the periphery of measuring body 2 so as to be out of alignment. The ribs are arranged in a manner so that lines representative of the direction of transmission of reactive force through ribs 5 to said measuring body are not aligned with the corresponding lines representing the transmission of load force through ribs 6. Said lines are parallel to the direction of application of the load as represented by arrow 15 and of the reactive force applied to base 4. The portions of measuring body 2 disposed in the interval between adjacent ones of said ribs 5 and 6 define measuring elements 11, 12, 13 and 14. Each of said measuring elements is under a shearing stress resulting from a couple of forces passing through said respective ribs 5 and 6. The surfaces of said measuring elements are provided with strain gauges 7, 8, 9 and 10, respectively. In the embodiment shown in the drawings, the strain gauges define an angle of 45° with the load direction so as to sense alternately the resultant tension stress and the resultant compressive stress respectively. The strain gauges 7, 8, 9 and 10, when connected into a closed circuit, can define a complete measuring bridge. All of the resistance elements of said measuring bridge take part in the deformation.

FIG. 2 represents another possible way of arranging the wire strain gauges, retaining the geometrical design as shown in FIG. 1. In this embodiment the wire strain gauges are provided in a plane perpendicular to the line of action of the force, so that the deformation arising at appropriate points, i.e., at surface elements of the normal plane tension field, is utilized for measuring the force. The upper shoulder 3 and the base 4 of the measuring body may be designed so as to be able to take up the tensile force indicated by an arrow 16. The measuring part 2 is confined, in addition to the bore 1 and to the outer lateral surfaces, by two planes perpendicular to said lateral surfaces. The wire strain gauges 19 are arranged on said planes on the surface elements 17 opposite to the ribs 5 and 6, while the wire strain gauges 20 are arranged on the surface elements 18 close to the ribs. The number of wire strain gauges is determined by the resistance values required for the bridge circuit. It is advisable to utilize for the arrangement of the wire strain gauges, the possibilities of symmetrical arrangement provided by the axis 21. Adjacent bridge branches are formed alternatingly from wire strain gauges 19 and 20 for tensile and compressive stresses, respectively. Thus, the whole bridge circuit is constituted by active components.

In the embodiment represented in FIG. 3, only the lower surface of the measuring part 2 is connected rigidly to the ribs 5 and 6 alternatingly, while the ribs 5 are connected to an outer ring acting as base 4, and ribs 6 are joined to an upper shoulder 3 which may have the form of an internal ring. In this manner the measuring part supported by the ribs 5 of the base 4 is drawn downward by the loading force with the aid of ribs 6 of the upper shoulder 3. The wire strain gauges 22 are situated opposite to the ribs 6 drawing the measuring part, whereas the wire strain gauges 23 are provided opposite to the supporting ribs 5.

By an appropriate design of the measuring bridge a complete active measuring bridge constituted fully by active components is achieved.

What is claimed is:
1. An electromechanical transducer comprising an upper shoulder for receiving the load; a lower base for receiving the reactive force; a central measuring body interposed between said base and shoulder, said base, measuring body and shoulder being aligned in spaced relation along an axis defined by the direction in which said load is applied to said shoulder; first ribs joining said shoulder and measuring body and adapted to transmit the force of said load to said measuring body along lines substantially parallel to said axis; second ribs joining said measuring body and said base adapted to transmit said reactive force to said measuring body along lines substantially parallel to said axis, said first and second ribs being alternately connected to said measuring body at spaced intervals along the periphery of said body, said measuring body having peripheral surfaces parallel to said axis in the intervals between adjacent ones of said first and second ribs; and strain gauge devices disposed on said measuring body peripheral surfaces.

2. An electromechanical transducer as recited in claim 1, wherein said strain gauge devices are aligned at an angle of 45° with said axis.

References Cited

UNITED STATES PATENTS

| | | | |
|---|---|---|---|
| 3,004,231 | 10/1961 | Laimins | 338—5 |
| 3,096,644 | 7/1963 | Seed. | |
| 3,216,245 | 11/1965 | Seed | 338—5 |
| 3,376,537 | 4/1968 | Pugnaire | 338—5 |
| 3,422,445 | 1/1969 | Jacobson | 338—5 |
| Re. 26,302 | 11/1967 | Seed et al. | |

RICHARD A. FARLEY, Primary Examiner

H. C. WAMSLEY, Assistant Examiner

U.S. Cl. X.R.

73—141